Dec. 18, 1934.     H. O. PETERSON     1,984,545
METHOD OF AND MEANS FOR COMPARING ALTERNATING CURRENT VOLTAGES
Filed Dec. 30, 1932
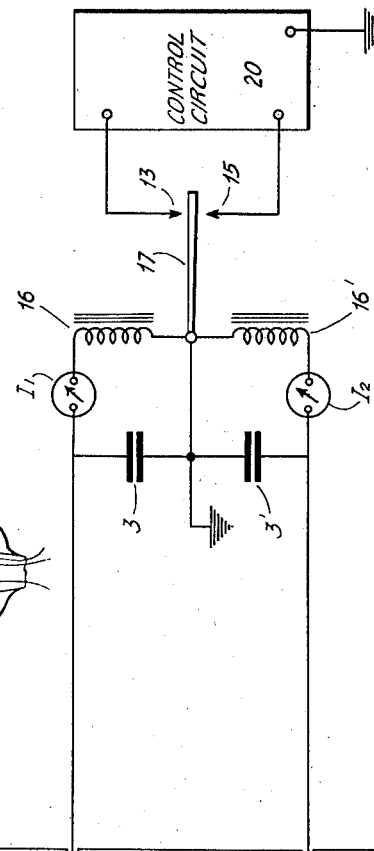
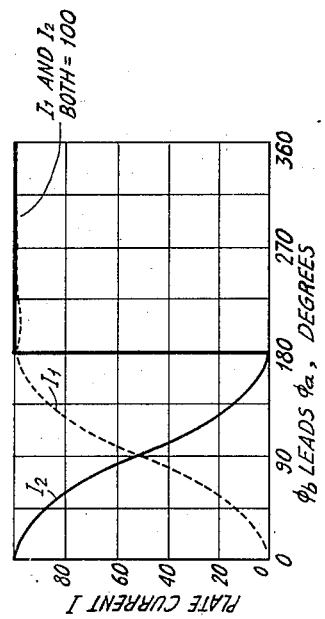
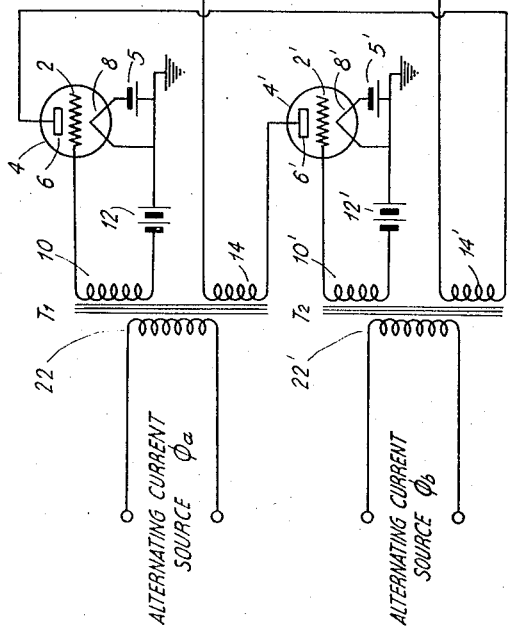
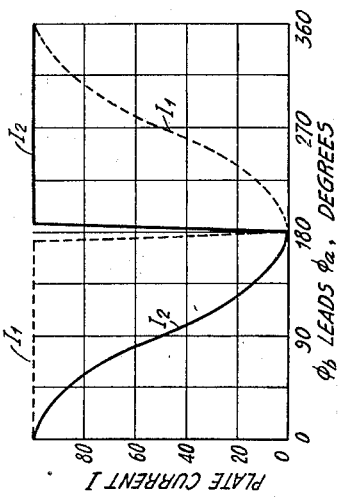
INVENTOR-
HAROLD O. PETERSON
BY
ATTORNEY- Patented Dec. 18, 1934

1,984,545

UNITED STATES PATENT OFFICE 1,984,545

METHOD OF AND MEANS FOR COMPARING ALTERNATING CURRENT VOLTAGES

Harold O. Peterson, Riverhead, N. Y., assignor to Radio Corporation of America, a corporation of Delaware Application December 30, 1932, Serial No. 649,492

7 Claims. (Cl. 172—245)

This invention relates to a method of and means for comparing two alternating currents of equal frequency but of a phase which might shift and for detecting any shift which may take place between the two alternating currents.

In accordance with this invention, means is also provided for utilizing the energy produced by comparing and detecting relative phase shifts between the alternating currents.

Numerous uses can be made of my method of and means for detecting relative phase of two alternating current voltages of equal frequency but different phase. Such a method and means can be used in the procedure of synchronizing two alternators and also for frequency monitoring alternating current generators, etc. Moreover, a method and means as disclosed herein can be utilized with devices as disclosed in United States application Serial No. 646,674, filed December 10, 1932. For example the arrangement of the present invention may be utilized to produce energy representative of the shift of a carrier wave source relative to a fixed source and use said energy to return said carrier wave source to the correct frequency, as disclosed in said application referred to above.

In detecting relative phase of two alternating current voltages of equal frequency but different phase or in comparing said currents of equal frequency and different phase, I make use of known operating characteristics of thermionic tubes of a type described more in detail hereinafter. The mechanism of control or plate control by phase relationship between grid voltage and plate voltage in thermionic tubes of the particular type described in detail hereinafter is well known to the art, it having been described in the General Electric Review for July 1929 by Dr. A. W. Hull.

Such a tube consists of an evacuated container enclosing a cathode, grid, anode and inert gas. This tube has the property whereby, if the grid electrode is maintained negative beyond a critical value, no anode current will flow even though high values of positive potential be applied to the anode electrode. However, if, while the anode electrode is positively charged, and the negative voltage applied to the grid electrode is reduced beyond a critical point, anode current will commence to flow and, having commenced to flow, will continue to flow until the positive polarization or charge is removed from the anode electrode. The arc through the tube then can only be started by applying the critical voltage to the grid. After starting the arc the flow or continuance thereof can not be affected by the grid, but it can be stopped by removing the anode voltage. The tube therefore operates with an intermittent arc discharge whose average current is controlled by the grid.

Consequently, if alternating current voltages of different phase are applied to the grid electrode and to the anode electrode of a tube of this type, the portion of the positive half of a cycle of applied anode current over which anode current will flow, i. e., an arc or discharge takes place, depends upon the time at which the control grid voltage has been applied. This in turn depends on whether the grid voltage is leading or lagging with respect to the anode voltage, and also depends upon the amount the applied voltages are displaced with respect to each other. The latter is so because, even if there is applied to the grid a critical voltage, there will be no arc started unless substantial positive potential is applied to the anode at this time. If the reader needs further enlightenment as to the operation of a tube of this type under the conditions indicated above, he is referred to Hull's article appearing on page 390 of the General Electric Review for July 1929 (volume 32—No. 7).

In the present invention I make use of this operation of said tube in a novel manner and circuit which includes two tubes of the type described connected and operated to produce effects characteristic of phase shifts between two currents of like frequency.

What I consider the novel features of my invention have been pointed out with particularity in the claims appended hereto.

My method of comparing or detecting relative phase shifts of two alternating current voltages of like frequency and an embodiment of an arrangement for carrying out said method will be described in detail hereinafter. In describing said method and said embodiment reference will be made to the drawing, in which:

Figure 1 shows an at present preferred embodiment of a phase shift detecting or comparing means arranged in accordance with the present invention; while, Figure 2 illustrates a tube of the type involved in the present invention;

Figures 3 and 4 illustrate how relative anode current intensities are affected by variations of phase angle.

In the drawing 4 and 4' indicate thermionic tubes of the type described above. Each tube includes control grid electrodes 2, 2', anodes 6, 6' and electron emission elements or cathodes 8, 8'.

The cathodes may be heated in any manner, as, for example, by means of sources of potential 5, 5' connected, as shown, in series with the cathodes 8, 8'. It will be understood, however, that the cathodes 8, 8' may be heated from separate sources, as shown, or from the same source either directly or indirectly. The cathode may be of the mercury pool type.

The control electrodes 2, 2' are connected, as shown, by way of secondary windings 10, 10' of transformers $T_1$, $T_2$ respectively, and sources 12, 12' to the cathodes 8, 8' of tubes 4, 4' respectively. The anodes 6, 6' are connected, as shown, by way of a second pair of windings 14', 14 of transformers $T_2$, $T_1$ respectively to the cathodes 8, 8' respectively by way of ground. The circuit between the anode 6 and cathode 8 includes a current intensity indicating device $I_2$ and a relay winding 16'. The circuit between the anode 6' and cathode 8' of tube 4' includes a current intensity indicating device $I_1$ and a relay winding 16. A contact closing tongue or armature 17 cooperates with two contacts 13 and 15 to complete circuits cooperating with the control mechanism in 20, which may include means to synchronize alternators or frequency monitoring means, or means for tuning high frequency generators of the thermionic type, etc.

The primary windings 22, 22' of transformers $T_1$ and $T_2$ may be connected with any alternating current sources not shown, but which are of like frequency and of phase relationship which may vary. Each transformer $T_1$, $T_2$ has two secondary windings 10, 14 and 10', 14', connected as described hereinbefore, so that alternating current from the transformer $T_1$ is supplied to the control grid electrode 2 of tube 4 and to the anode electrode 6' of tube 4', while the alternating current appearing in transformer $T_2$ is supplied to the control grid electrode 2' of tube 4' and to the anode electrode 6 of tube 4. The control grid electrodes 2, 2' are normally maintained at a negative potential by the sources 12, 12' such that, unless the voltages applied to the anodes of said tubes exceed a critical value, no current flows in the anode circuits even though positive potentials just short of said critical value are applied to the anodes by way of the secondary windings 14, 14'.

In operation it is assumed that two alternating currents of like frequency, but of phase relation which may shift, are applied to the primary windings of transformers $T_1$, $T_2$. Now if the phase of one of these primary voltages is advanced with respect to the other, variations in $I_1$ and $I_2$ will be obtained in accordance with curves of Figure 3 and Figure 4. Whether the response will be in accordance with Figure 3 or Figure 4 depends upon the relative polarizations of secondaries 10, 14 and 10', 14'. Under one set of conditions we will obtain the response characteristics shown in Figure 3. Then by merely reversing one of these secondaries, leaving the others unchanged, we may obtain the characteristic shown in Figure 4. Obviously, either one of these operating characteristics afford a means of indicating phase relationship between the two primary voltages. For the condition of Figure 4, when the phases of the applied alternating currents differ by 90° the two applied currents, that is, the currents flowing in $I_1$ and $I_2$, should be substantially equal.

The current indicator $I_1$ and relay winding 16 are shunted by a by-pass and charging condenser 3, while the relay winding 16' and the indicator $I_2$ are shunted by a by-pass and charging condenser 3'. These condensers prevent any currents of fundamental frequency, that is, of the applied frequency, which may get through the thyratrons 4, 4', from reaching the indicators $I_1$ and $I_2$ and the relay windings 16, 16'. Their effect is therefore to prevent chattering of the relay 17.

The relay tongue or armature 17 will take a position depending upon whether windings 16, 16' carry no currents or equal currents, or currents of different intensity. In the case where no currents or currents of equal intensity flow in the windings 16, 16', the relay tongue 17 will assume a neutral position between the contacts 13 and 15 so that the circuit connected with 20 is not closed. If the current flowing in one winding, for instance 16, is of greater intensity than the current flowing in 16', the relay tongue 17 will be moved into a position to close contact with 13.

The control device 20 may include means for controlling alternators, for frequency monitoring and/or for tuning transmitters. The alternators controlled may be the sources of the currents applied to the tubes. The indications may be observed and the systems including the sources of alternating current compared monitored in accordance with said indications. The current changes in the output of tubes 4 and 4' may be utilized to tune a transmitter which is in turn the source of one of the currents, the phase of which is to be compared. The nature of the device in 20 forms no part of the present invention and need not be described herein.

In Figure 2 is shown a tube of the type described above and in particular the relative positioning of the elements of such a tube.

Having thus described my invention and the operation thereof, what I claim is:

1. Phase detecting means comprising, a pair of thermionic tubes having anode, control and emission electrodes, means for biasing the control electrode of each of said tubes to such a value that no current flows until a positive potential exceeding a predetermined value is applied to the anodes of said tubes, means for applying alternating current to the control grid of one of said tubes and to the anode of the other of said tubes, means for applying a second alternating current to the anode of said first named tube and to the control grid of said second named tube, and indicating means connected with the anodes of each of said tubes.

2. The combination, with a pair of sources of alternating current of substantially like frequency, of a pair of thermionic tubes each having anode, cathode and control grid electrodes, means for biasing the control grid electrodes of each tube to a predetermined negative value, a circuit for applying alternating current from one of said sources to the control grid of one of said tubes and to the anode of the other of said tubes, a circuit for applying alternating current from the other of said sources to the anode of the first of said tubes and to the control grid of the second of said tubes, and a translating device connected with the anode of each of said tubes.

3. The method of detecting the phase shift between two alternating currents of like frequency and of unlike phase which includes the steps of, applying each of said currents to a separate medium of variable conductivity, and varying the conductivity of the first medium in accordance with variations in amplitude of the current applied to the second medium and the conductivity of the second medium in accordance with the amplitude of the currents applied to the first medium.

4. Phase detecting means comprising, a pair of gaseous discharge tubes, a circuit for biasing the control electrode of each of said tubes to such a value that no current flows in the anode circuit until a positive potential exceeding a predetermined value is applied to the anodes of said tubes, a circuit for applying alternating current to the control grid of one of said tubes and to the anode of the other of said tubes, a circuit for applying a second alternating current to the anode of said first named tube and to the control grid of said second named tube, and a utilization circuit connected with the anodes of each of said tubes.

5. Means for comparing phase differences between two alternating currents of like frequency including, a pair of tubes of the type in which the potential on the control grid determines the conductivity of the tube and potential on the anode maintains the tube conductive, means for applying one of said frequencies to the control grid of one of said tubes and the anode of the other of said tubes, means for applying the other of said frequencies to the anode of said first tube and the control grid of said last named tube, and a translating circuit connected with the anodes of each of said tubes.

6. The combination, with a pair of sources of alternating current of substantially like frequency and of phase which may vary, of a pair of thermionic tubes of the type in which a flow of current is initiated by a critical grid potential and continuance of said flow is maintained as long as a positive potential is applied to the anode of said tube, a circuit for applying alternating current from one of said sources to the control grid of one of said tubes and to the anode of the other of said tubes, a circuit for applying alternating current from the other of said sources to the anode of the first of said tubes and to the control grid of the second of said tubes, and a relay winding connected with the anode of each of said tubes.

7. The combination, with a pair of sources of alternating current of like frequency and unlike phase, of a pair of thermionic tubes of the type in which a flow of current is initiated by a critical grid potential and continuance of said flow of current is maintained as long as a positive potential is applied to the anode of said tube, a circuit including a transformer for applying alternating current from one of said sources to the control grid of one of said tubes and to the anode of the other of said tubes, a circuit including a transformer for applying alternating current from the other of said sources to the anode of the first of said tubes and to the control grid of the second of said tubes, and current intensity indicating means in each of said last named circuits.

HAROLD O. PETERSON.